United States Patent [19]

Tada et al.

[11] Patent Number: 5,139,805

[45] Date of Patent: Aug. 18, 1992

[54] MULTI-PLY HEAT-SHRINKABLE FILM FOR WRAPPING COOKED OR PROCESSED MEATS AND PRODUCTS PACKAGED THEREWITH

[75] Inventors: Teruo Tada; Nobuya Ishiguro; Kazuo Kondoh, all of Marugame, Japan

[73] Assignee: Okura Industrial Co., Ltd., Japan

[21] Appl. No.: 535,716

[22] Filed: Jun. 11, 1990

[30] Foreign Application Priority Data

Apr. 21, 1990 [JP] Japan ................... 2-105847

[51] Int. Cl.$^5$ ............................................. B65B 55/00
[52] U.S. Cl. ...................... 426/412; 426/127; 426/129; 428/34.8; 428/34.9; 428/913
[58] Field of Search ............. 426/127, 129, 912; 428/34.7, 34.9, 34.8, 35.7, 516, 523, 913

[56] References Cited

U.S. PATENT DOCUMENTS

| | | | |
|---|---|---|---|
| 3,625,348 | 12/1971 | Titchenal et al. | 426/129 |
| 4,409,286 | 10/1983 | Decroix | 264/171 |
| 4,469,742 | 9/1984 | Oberle et al. | 426/127 |
| 4,525,414 | 6/1985 | Ohya et al. | 428/913 |
| 4,740,558 | 4/1988 | Mashita et al. | 525/150 |
| 4,911,979 | 3/1990 | Nishimoto et al. | 428/475.2 |

*Primary Examiner*—Donald E. Czaja
*Assistant Examiner*—Anthony Weier
*Attorney, Agent, or Firm*—Lorusso & Loud

[57] ABSTRACT

A multi-ply, heat-shrinkable film has a surface layer for contact with a cooked or processed meat product which is formed of an ethylene-ethyl acrylate-maleic anhydride copolymer or a mixture of the ethylene-ethyl acrylate-maleic anhydride copolymer and a polyolefin, with the content of ethyl acrylate component in the surface layer being 2 to 20% by weight and the content of maleic anhydride component being 1 to 5% by weight. A cooked or processed meat product may be packaged with the multi-ply, heat-shrinkable film and formed according to "zero-loss cooking method".

6 Claims, No Drawings

MULTI-PLY HEAT-SHRINKABLE FILM FOR WRAPPING COOKED OR PROCESSED MEATS AND PRODUCTS PACKAGED THEREWITH

BACKGROUND OF THE INVENTION

1. Field of the Invention

The present invention relates to a multi-ply, heat-shrinkable film adapted for so-called "zero-loss cooking method" (to be described in detail hereinafter) and having excellent adhesion properties to cooked or processed meat products and to a cooked or processed meat product packaged therewith.

2. Description of Prior Art

"Zero-loss cooking method" having recently become widespread comprises the following steps.

1. Seasonings are added to raw meat, followed by well kneading the meat for infiltrating the meat with the seasonings.

2. After leaving the meat infiltrated with the seasonings for about one day, the meat is again well kneaded and placed in a heat-shrinkable packaging bag, followed by vacuum packaging.

3. This packaged product is closely packed in a metal mold, followed by closing the metal mold and applying a load through a spring.

4. The metal mold packed with the packaged product is heat-treated in a steam of 75° to 80° C. for about 6 hours.

At this stage, the packaging bag shrinks due to its heat-shrinking properties, thus a tightly packaged product being obtained.

5. After the thermal treatment, the metal mold packed with the packaged product is cooled. After cooling, the packaged product is taken out of the metal mold, then stored in a refrigerator for about 20 hours to obtain a final product.

The above-described method is called "zero-loss cooking method" since it enables one to thermally process packaged meat as such to obtain a processed meat package, involving absolutely no losses with respect to meat and packaging material.

As packaging materials for use in such "zero-loss cooking method", there have so far been used those materials which have conventionally been used for packaging raw meat and processed meat, such as a three-ply laminate tubing made of heat-shrinkable film [ethylene-vinyl acetate copolymer (outer side of the tubing)/polyvinylidene chloride resin/cross linked ethylene-vinyl acetate copolymer (inner side of the tubing)] based on technique described in Japanese Examined Patent Publication No. 58-43024 (corresponding to U.S. Pat. No. 3,741,253) and four-ply laminate tubing made of heat-shrinkable film [polyamide resin (outer surface of the tubing)/saponified product of ethylene-vinyl acetate copolymer/an adhesive resin/ethylene-vinyl acetate copolymer (inner surface of the tubing)] based on the technique described in Japanese Unexamined Patent Publication Nos. 58-14743 and 59-152853. However, these heat-shrinkable films show such a poor adhesion to processed meat products obtained according to the "zero-loss cooking method" that meat juice (drip) of the cooked and processed meat product oozes out on the surface and gathers there, which causes the problem that the packaged product appears aged and the problem of deteriorated preservability due to propagation of bacteria.

Additionally, Japanese Examined Patent Publication No. 1-18865 (corresponding to U.S. Pat. No. 4,409,286) describes to use an ethylene-ethyl acrylate-maleic anhydride copolymer as one ply of a multi-ply structure. However, this film is neither a heat-shrinkable film nor a film for use in "zero-loss cooking method".

SUMMARY OF THE INVENTION

As a result of investigating adhesion of various multi-ply heat-shrinkable films to cooked or processed meat products using a variety of heat-sealable resins as the surface layer to be in contact with cooked or processed meat products in "zero-loss cooking method" for the purpose of solving the above-described problem of gathering of drip or preventing the drip from gathering, the inventors have found that a multi-ply, heat-shrinkable film having a surface layer composed of an ethylene-ethyl acrylate-malelic anhydride copolymer to be in contact with cooked or processed meat products shows an excellent adhesion to processed meat products, thus having achieved the present invention.

It is an object of the present invention to provide a multi-ply, heat-shrinkable film adapted for "zero-loss cooking method".

Another object of the present invention is to provide a multi-ply, heat-shrinkable film comprising a surface layer having good adhesion properties to a cooked or processed meat product.

A further object of the present invention is to provide a cooked meat product packaged with the multi-ply heat-shrinkable film.

In accomplishing the foregoing objects, there is provided in accordance with one aspect of the present invention a multi-ply, heat-shrinkable film comprising a surface layer formed of a polymeric material which comprises an ethylene-ethyl acrylate-maleic anhydride copolymer, said polymeric material having an ethyl acrylate content of 2 to 20% by weight and a maleic anhydride content of 1 to 5% by weight.

In another aspect, the present invention provides a cooked meat product obtained by a zero-loss cooking method which includes the steps of vacuum-packaging raw meat with the multi-ply, heat-shrinkable film with said surface layer being in direct contact with said meat, and thermally treating the resulting packaged meat under pressure.

Other objects, features and advantages of the present invention will become apparent from the detailed description of the invention to follow.

DETAILED DESCRIPTION OF THE INVENTION

The content of ethyl acrylate component in the surface layer of the multi-ply, heat-shrinkable film in accordance with the present invention must be in the range of from 2 to 20% by weight. If the content is less than 2% by weight, the resulting film has a decreased fitting properties, and there arises the problem that sufficient deaeration cannot be attained upon vacuum packaging, whereas if the content is more than 20% by weight, there arises delamination of seal upon heat shrinkage and upon sterilization by boiling due to a decrease in heat resistance. On the other hand, the content of maleic anhydride component must be in the range of from 1 to 5% by weight. If the content is less than 1% by weight, the resulting film has poor adhesion properties to processed meat, whereas if the content is more than 5% by weight, adhesion between the resulting film and processed meat becomes so strong that delamination of the film from processed meat becomes difficult. In preferred embodiments of the present invention, the surface layer of the multi-ply, heat-shrinkable film, which comprises an ethylene-ethyl acrylate-maleic anhydride copolymer or a mixture of said ethylene-ethyl acrylate-maleic anhydride copolymer and a polyolefin, has an ethyl acrylate component in a content of 5 to 15% by weight from the standpoint of attaining good flexing properties and good heat resistance, and has a maleic anhydride component in a content of 2 to 4% by weight.

Additionally, in the case where the surface layer of said multi-ply, heat-shrinkable film comprises a mixture of the ethylene-ethyl acrylate-maleic anhydride copolymer and a polyolefin, the mixing ratio of the ethylene-ethyl acrylate-maleic anhydride copolymer to the polyolefine be desirably such that the content of the ethylene-ethyl acrylate-maleic anhydride copolymer is 50% by weight or more and that of the polyolefin 50% by weight or less, with the contents of the ethyl acrylate component and the maleic anhydride component in said mixture (surface layer) being 5 to 15% by weight and 2 to 4% by weight, respectively.

The ethylene-ethyl acrylate-maleic anhydride copolymer is not limited as to melt index. In view of filming properties, however, copolymers with a melt index (measured according to ASTM D-1238) of 1.0 g/10 minutes to 20.0 g/10 minutes are preferred. The ethylene-ethyl acrylate-maleic anhydride copolymer to be used in the present invention may be a block copolymer or a graft copolymer. Further, the ethylene-ethyl acrylate-maleic anhydride copolymer may be used as a mixture with other polyolefin. In this case, components of the ethyl acrylate component and the maleic anhydride component must be in the mixture must be within the ranges described above so as to attain the objects of the present invention. As the other polyolefin, there are illustrated polypropylene homopolymer, propylene-ethylene copolymer, propylene-ethylene-butene copolymer, polybutene, butene-propylene copolymer, butene-ethylene copolymer, linear low-density polyethylene, low-density polyethylene, very low-density polyethylene (VLDPE), ethylene-vinyl acetate copolymer, ethylene-ethyl acrylate copolymer, ethylene-methacrylate copolymer, ethylene-acrylic acid copolymer, and ionomer. In addition, modified polyolefins thereof may be used. A mixture of two or more of these polyolefins may be used as well. With ethylene-vinyl acetate copolymer, content of the vinyl acetate component be desirably 10 to 15% by weight in view of flexibility and transparence of resulting film.

The multi-ply, heat-shrinkable film in accordance with the present invention, which is intended to be used for packaging cooked or processed meat products in "zero-loss cooking method", may have a constituent ply composed of a resin having excellent gas barrier properties and toughness such as a saponified ethylene-vinyl acetate copolymer, a polyvinylidene chloride resin or a polyamide resin. In view of attaining high gas barrier properties, however, it is preferred to use a saponified ethylene-vinyl acetate copolymer as one ply of the multiply film. As to film structure of the multi-ply, heat-shrinkable film of the present invention using the ethylene-ethyl acrylate-maleic anhydride copolymer or a mixture of the ethylene-ethyl acrylate-maleic anhydride copolymer and a polyolefin, there are illustrated those heat-shrinkable films having a film structure of: PA/APO; APO/PA/APO; PO/PA/APO; PA/EVOH/APO; APO/EVOH/APO; PO/PA/EVOH/APO; APO/PA/EVOH/APO; PA/EVOH/APO; PA/APO/EVOH/APO; PA/PO/EVOH/APO; PET/APO; APO/PET/APO; PET/APO/EVOH/APO; PO/PET/APO; PO/PVDC/APO; APO/PVDC/APO; PO/PA/APO/PVDC/APO; PA/APO/PVDC/APO; PA/PO/PVDC/APO; etc. In the above-described notation, APO stands for a resin composition used for the surface layer in the multi-ply, heat-shrinkable film of the present invention. PA is an abbreviation of a polyamide resin, and is exemplified by N-6, N-66, N-6. 66 copolymer, and N-6. 66. 12 copolymer and N-6. 12 copolymer. PO is an abbreviation of polyolefin and includes the above-described polypropylene homopolymer, propylene-ethylene copolymer, propylene-ethylene-butene copolymer, poly-butene, butene-propylene copolymer, butene-ethylene copolymer, linear low-density polyethylene, low-density polyethylene, very low-density polyethylene (VLDPE), ethylene-vinyl acetate copolymer, ethylene-ethyl acrylate copolymer, ethylene-methacrylate copolymer, ethylene-acrylic acid copolymer, and ionomer. In order to improve adhesion properties, modified polyolefins thereof may also be used. EVOH is an abbreviation of a saponified ethylene-vinyl acetate copolymer, As this copolymer, those which have an ethylene content of 20 to 60 mol % and a saponification degree of 90% or more are preferred in view of moldability and gas barrier properties. PET includes polyethylene terephthalate and polyesters using cyclohexanedimethanol. PVDC is an abbreviation of polyvinylidene chloride and includes copolymers with vinyl chloride or acrylic ester. Additionally, the packaging material for use in "zero-loss cooking method" must have heat-shrinkable properties. Films with no heat-shrinkable properties are not preferred since drip is liable to gather in wrinkles formed upon vacuum packaging. Degree of shrinkage of the heat-shrinkable film is generally 10 to 30%/20 to 40% (longitudinal direction/transverse direction) measured in a 80° C. hot water for 30 seconds.

The multi-ply, heat-shrinkable film of the present invention is generally produced by forming a laminate by co-extrusion method, then stretching the laminate at a stretching ratio of 2.5 to 4.0 in both a longitudinal direction and a transverse direction by inflation method.

Cooked or processed meat products packaged by the multi-ply, heat-shrinkable film in accordance with the present invention does not suffer gathering of drip on the surface thereof due to good adhesion between the meat product and the multiply heat-shrinkable film, thus giving a lasting good appearance. In addition, they suffer less propagation of bacteria and show a good preservability. Thus, the present invention provides marked contribution to the meat-processing field.

The present invention is now illustrated in greater detail by reference to the following examples which, however, are not to be construed as limiting the present invention in any way.

EXAMPLES 1 to 4 and COMPARATIVE EXAMPLES 1 to 5

A laminate having a multi-ply structure of (a) outermost ethylene-vinyl acetate copolymer (EVA; content of vinyl acetate: 10% by weight), (b) polyamide (PA; N-6. 66 copolymer), (c) saponified ethylene-vinyl acetate copolymer l(EVOH; content of ethylene: 38 mol %; saponification degree: 99%) and (d) innermost ply to be in contact with meat (component formulation: shown in Table 1) was prepared by co-extrusion method. Then, the laminate was stretched under the condition of 3.0×3.0 in stretching ratio and 100° C. in stretching temperature to obtain a stretched tube having a lay-flat width of 300 mm and having a (a)/(b)/(c)/(d) structure of 15 μ/20 μ/10 μ/15 μ in thickness. This tube showed degrees of shrinkage of 18% and 25% in a longitudinal direction and a transverse direction, respectively. This tube was cut into 400-mm long pieces, and one opening end was heat-sealed to prepare bags of 300 mm (flat-fold width)×400 mm (length). About 5 kg of red pig meat was filled in the bag, then vacuum-packaged using a vacuum-packaging machine.

Then, the thus-packaged meat was then packed in a metal mold of 300 mm (length)×200 mm (width)×200 mm (depth) with no space, and the mold was closed with applying a load of about 50 kg. The metal mold packed with the bags was heated for 6 hours in a 75° to 80° C. steam. After cooling the metal mold, the bags were taken out of the mold, and were further cooled to room temperature to observe "adhesion properties", "heat resistance", "flexibility" and "dripping". The results thus obtained are tabulated in Table 1. Additionally, sufficient adhesion properties between the packaging film and the processed meat product are required at the stage where the thermally treated, tight-packaged meat product is cooled to room temperature. If the adhesion properties are insufficient at this stage, drip oozes out of the meat to gather inside the bag. Therefore, adhesion properties between the multi-ply, heat-shrinkable film for packaging processed meat products and the packaged meat product were evaluated at the stage where the thermally treated, tight-packaged meat products were cooled to room temperature.

"Adhesion properties" were scored according to the following standard: "A" . . . Processed meat only slightly adheres to the film; "B" . . . Delamination of the film from the processed meat is somewhat difficult and results in damaged appearance, since the meat adheres to the whole surface of the film; "C" . . . Processed meat adheres to such degree that it shows only a slight delamination resistance from the film; "D" . . . Processed meat shows no delamination resistance from the film.

"Heat resistance" was scored according to the following standard: "A" . . . No changes are observed in heat-sealed portion upon thermal processing; "d" . . . Delamination takes place in the heat-sealed portion.

"Flexibility" was scored according to the following standard: "A" . . . The film is enough flexible to permit easy deaeration upon vacuum packaging; "D" . . . Deaeration upon vacuum packaging is difficult.

"Dripping" was scored according to the following standard: "A" . . . No dripping is observed, and packaged products have excellent commercial values; "B" . . . Slight dripping is observed, and packaged products suffer a decrease in commercial value; "D" . . . Much dripping is observed, and packaged products have no commercial values.

As is shown in Table 1, multiply heat-shrinkable films (Examples 1 to 4) having, as a surface ply to be in contact with processed meat, (a) ethylene-ethyl acrylate-maleic anhydride copolymer (E-EA-MAH) containing the ethyl acrylate component in an amount of 2 to 20% by weight and the maleic anhydride component in an amount of 1 to 5% by weight or (b) a mixture of said copolymer (E-EA-MAH) and a polyolefin of ethylene-vinyl acetate copolymer (EVA) having the ethyl acrylate component in an amount of 2 to 20% by weight and the maleic anhydride component of 1 to 5% by weight show good adhesion properties to processed meat. However, multi-ply, heat-shrinkable films (Comparative Examples 1 to 5) having a surface layer wherein the content of ethyl acrylate component is less than 2% by weight or more than 20% by weight and the content of maleic anhydride component less than 1% by weight or more than 5% by weight (outside the scope of the present invention) had such poor adhesion properties that much dripping occurred, leading to deterioration of commercial values, or had too strong adhesion properties to delaminate, leading to deterioration of commercial values. Some of the comparative samples suffered delamination of the heat-sealed portion.

TABLE 1

| | Formulation of Innermost Ply | | | Results of Evaluation | | | |
|---|---|---|---|---|---|---|---|
| | Components | Content of EA | Content of MAH | *4 | *5 | *6 | *7 |
| Ex. 1 | E-EA-MAH | 6 wt % | 3 wt % | A | A | A | A |
| Ex. 2 | E-EA-MAH + EVA (*1) (7:3) | 4 wt % | 2 wt % | A | A | A | A |
| Ex. 3 | E-EA-MAH + EVA (*1) (5:5) | 3 wt % | 1.5 wt % | A | A | A | A |
| Ex. 4 | E-EA-MAH + EVA (*1) (3:7) | 2 wt % | 1 wt % | A | A | A | A |
| Comp. Ex. 1 | E-EA-MAH + EVA (*1) (1:9) | 0.6 wt % | 0.3 wt % | B | A | C | C |
| Comp. Ex. 2 | E-EA-MAH | 21 wt % | 6 wt % | A | D | B | A |
| Comp. Ex. 3 | EVA (*1) | — | — | A | A | D | D |
| Comp. Ex. 4 | EVA (*2) | 9 wt % | — | A | A | D | D |
| Comp. Ex. 5 | EMAA (*3) | — | — | A | A | D | D |

*1: Ethylene-vinyl acetate copolymer (vinyl acetate content: 10% by weight)
*2: Ethylene-ethyl acrylate copolymer (EA content: 9% by weight)
*3: Ethylene-methacrylic acid copolymer (MAA content: 9% by weight)
*4: Flexibility
*5: Heat resistance
*6: Adhesion properties
*7: Dripping EXAMPLES 5 to 12 and COMPARATIVE EXAMPLES 6 to 8

A laminate having a multi-ply structure of (a) outermost polyamide (PA: N-6. 66 copolymer), (b) saponified ethylene-vinyl acetate copolymer (EVOH: content of ethylene: 44 mol %; saponification degree: 99%), (c) adhesive ethylene-vinyl acetate copolymer and (d) innermost ply to be in contact with meat (component formulation: shown in Table 2) was prepared by co-extrusion method. Then, the laminate was stretched under the condition of 3.0×3.0 in stretching ratio and 105° C. in stretching temperature to obtain a stretched tube having a flat-fold width of 300 mm and having an (a)/(b)/(c)/(d) structure of 12 μ/6 μ/6μ/16μ in thickness. This tube showed degrees of shrinkage of 20% and 28% in a longitudinal direction and a transverse direction, respectively. This tube was cut into 400-mm long pieces, and one opening end was heat-sealed to prepare bags of 300 mm (flat-fold width)×400 mm (length)). About 5 kg of red pig meat was filled in the bag, then vacuum-packaged using a vacuum-packaging machine.

Then, the thus-packaged meat was then packed in a metal mold of 300 mm (length)×200 mm (width)×200 mm (depth) with no space, and the mold was closed with applying a load of about 50 kg. The metal mold packed with the bags was heated for 6 hours in a 75° to 80° C. steam. After cooling the metal mold, the bags were taken out of the mold, and were further cooled to room temperature to observe "adhesion properties", "heat resistance", "flexibility" and "dripping". The results thus obtained are tabulated in Table 2.

Additionally, "adhesion properties", "heat resistance", "flexibility" and "dripping" were evaluated in the same manner as with Table 1.

As is shown in Table 2, multi-ply, heat-shrinkable films (Examples 5 to 12) having, as a surface layer to be in contact with processed meat, ethylene-ethyl acrylate-maleic anhydride copolymer (E-EA-MAH) containing the ethyl acrylate component in an amount of 2 to 20% by weight and the maleic anhydride component in an amount of 1 to 5% by weight show good adhesion properties to processed meat, thus suffering less dripping.

TABLE 2

|  | Formulation of Innermost Ply | | | Results of Evaluation | | | |
|---|---|---|---|---|---|---|---|
| | Components | Content of EA | Content of MAH | *5 | *6 | *7 | *8 |
| Ex. 5 | E-EA-MAH | 7 wt % | 2 wt % | A | A | A | A |
| Ex. 6 | E-EA-MAH | 5 wt % | 4 wt % | A | A | A | A |
| Ex. 7 | E-EA-MAH | 13 wt % | 2 wt % | A | A | A | A |
| Ex. 8 | E-EA-MAH | 20 wt % | 2 wt % | A | A | A | A |
| Ex. 9 | E-EA-MAH + EVA (*1) (5:5) | 2.5 wt % | 2 wt % | A | A | A | A |
| Ex. 10 | E-EA-MAH + EVA (*2) (5:5) | 7 wt % | 2 wt % | A | A | A | A |
| Ex. 11 | E-EA-MAH + EMAA (*3) (5:5) | 2.5 wt % | 2 wt % | A | A | A | A |
| Ex. 12 | E-EA-MAH + Ionomer (*4) (5:5) | 2.5 wt % | 2 wt % | A | A | A | A |
| Comp. Ex. 6 | EVA (*1) | — | — | A | A | D | D |
| Comp. Ex. 7 | EEA (*2) | 9 wt % | — | A | A | D | D |
| Comp. Ex. 8 | EMAA (*3) | — | — | A | A | D | D |
| Comp. Ex. 9 | Ionomer (*4) | — | — | A | A | D | D |

*1: Ethylene-vinyl acetate copolymer (vinyl acetate content: 10% by weight)
*2: Ethylene-ethyl acrylate copolymer (EA content: 9% by weight)
*3: Ethylene-methacrylic acid copolymer (MAA content: 9% by weight)
*4: Ionomer between ethylene methacrylic acid copolymer and Zn
*5: Flexibility
*6: Heat resistance
*7: Adhesion properties
*8: Dripping While the present invention has been described in detail and with reference to specific embodiments thereof, it is apparent to one skilled in the art that various changes and modifications can be made therein without departing from the spirit and the scope of the present invention.

What is claimed is:

1. A multi-ply, heat-shrinkable film comprising a surface layer formed of a polymeric material which comprises a mixture of a polyolefin and an ethylene-ethyl acrylate-maleic anhydride copolymer, said polymeric material having an ethyl acrylate content of 2 to 20% by weight and a maleic anhydride content of 1 to 5% by weight.

2. The film as set forth in claim 1, wherein said mixture contains 50% by weight or more o the ethylene-ethyl acrylate-maleic anhydride copolymer and 50% by weight or less of said polyolefin, said polyolefin being an ethylene-vinyl acetate copolymer having a vinyl acetate content of 10 to 15% by weight.

3. The film as set forth in claim 1, further comprising a layer containing a saponified ethylene-vinyl acetate copolymer having an ethylene content of 20 to 60 mol % and a saponification degree of 90% or more.

4. A cooked meat product obtained by a zero-loss cooking method which includes the steps of vacuum-packaging raw meat with a multi-ply, heat shrinkable film according to claim 1 with said surface layer being in direct contact with said meat, and thermally treating the resulting packaged meat under pressure.

5. The multi-ply heat-shrinkable film of claim 1 wherein said surface layer contains at least 50% by weight of said ethylene-ethyl acrylate-maleic anhydride copolymer.

6. The film as set forth in claim 1, wherein said polymeric material has an ethyl acrylate content of 5 to 15% by weight and a maleic anhydride content of 2 to 4% by weight.

* * * * *

UNITED STATES PATENT AND TRADEMARK OFFICE
CERTIFICATE OF CORRECTION

PATENT NO. : 5,139,805

DATED : August 18, 1992

INVENTOR(S) : TADA et al

It is certified that error appears in the above-identified patent and that said Letters Patent is hereby corrected as shown below:

Col. 8, line 29, delete "o" and insert --of--.

Signed and Sealed this

Nineteenth Day of October, 1993

Attest:

BRUCE LEHMAN

*Attesting Officer*     Commissioner of Patents and Trademarks